April 19, 1960  J. R. DINNING  2,933,156
ELEVATOR SUPERVISORY CONTROL
Filed Jan. 21, 1959  7 Sheets-Sheet 1
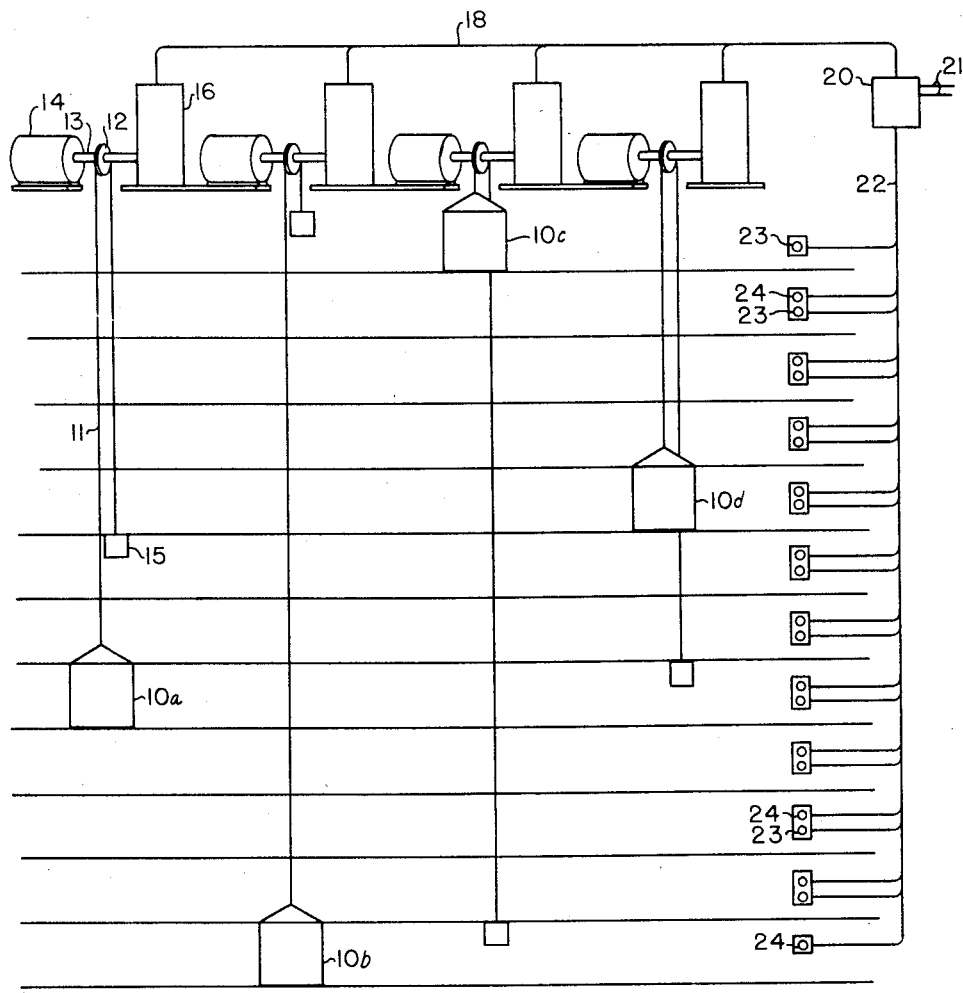
Fig. I
INVENTOR.
JOHN R. DINNING
BY
Marshall, Marshall & Yeasting
ATTORNEYS

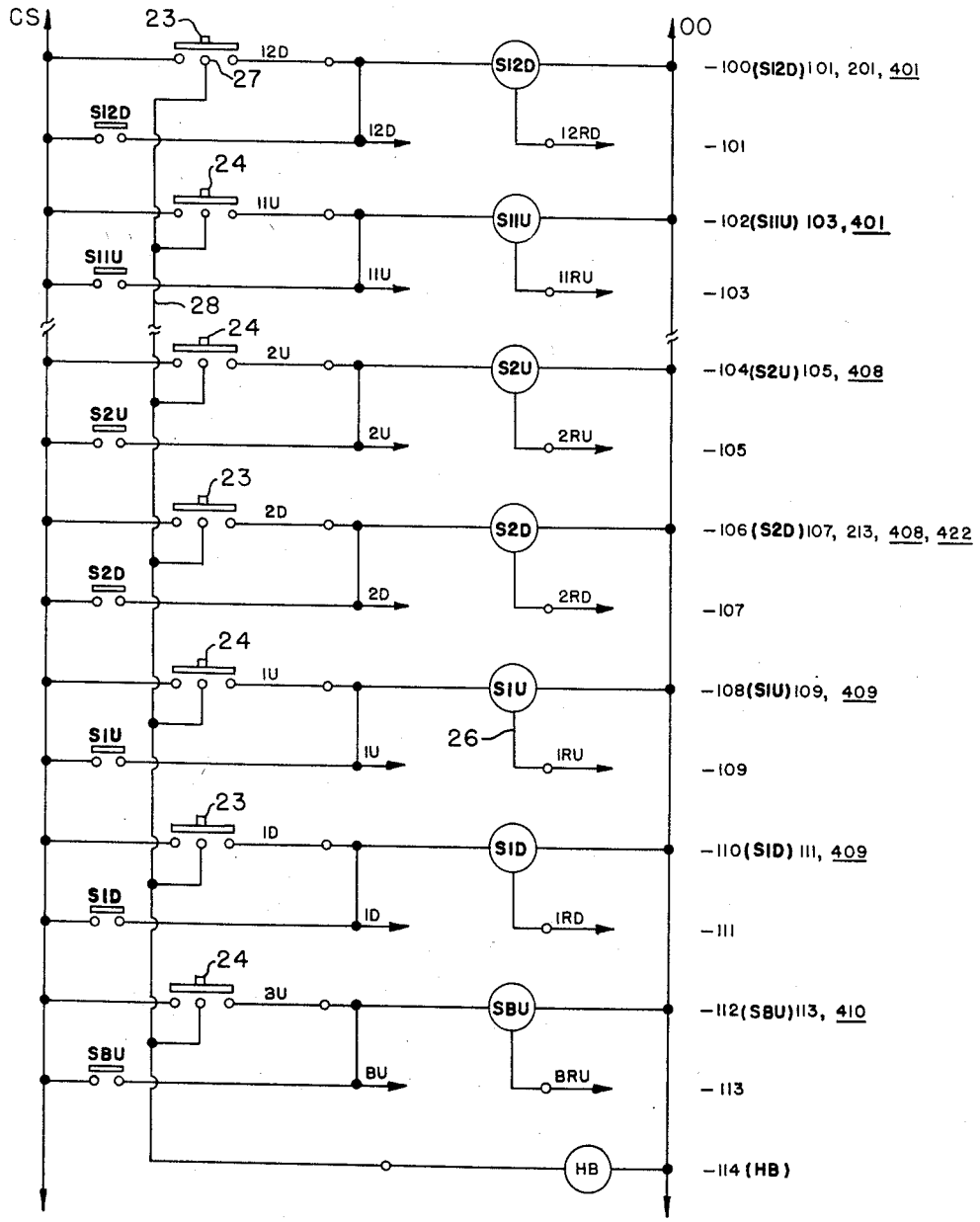
Fig. II

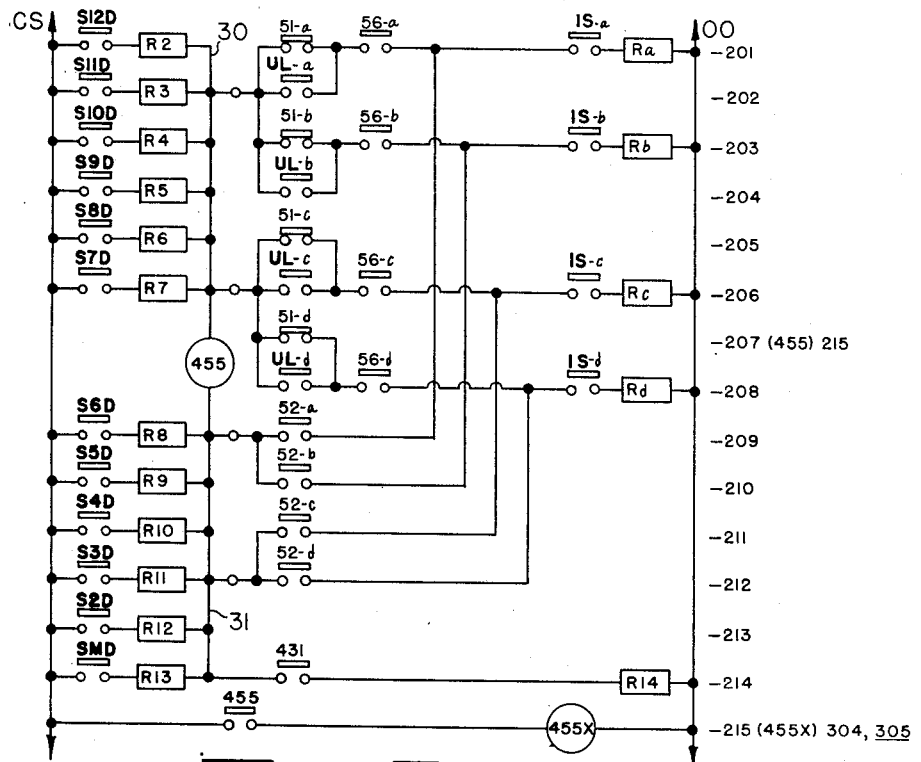
Fig. III
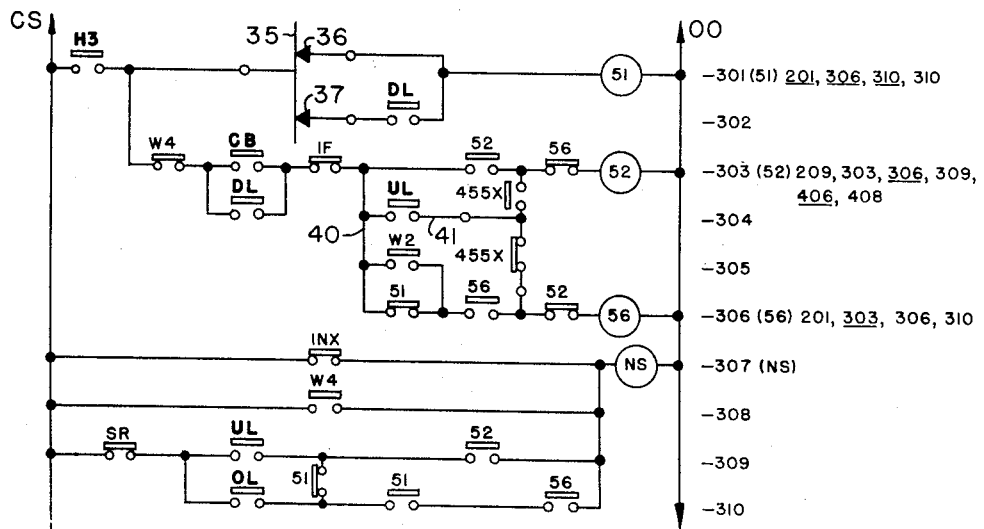
Fig. IV
INVENTOR.
JOHN R. DINNING

April 19, 1960 J. R. DINNING 2,933,156
ELEVATOR SUPERVISORY CONTROL
Filed Jan. 21, 1959 7 Sheets-Sheet 4
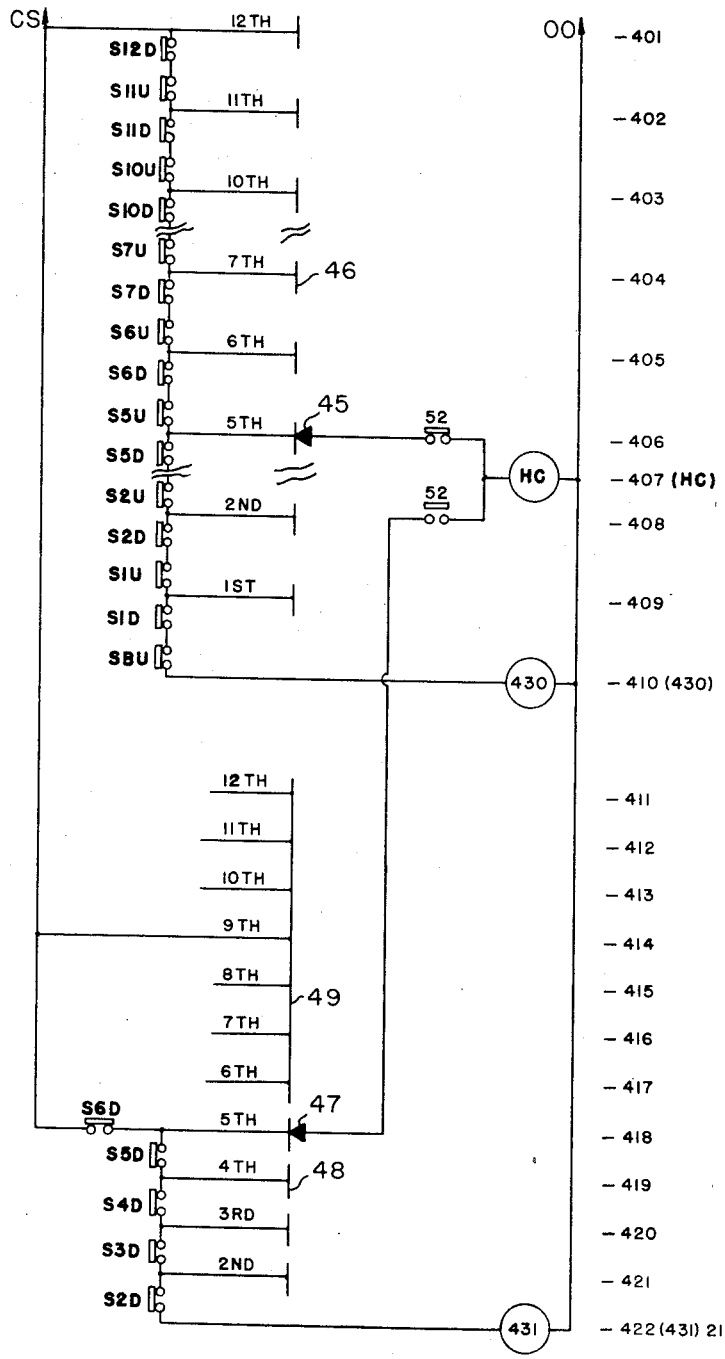
Fig. V
INVENTOR.
JOHN R. DINNING
BY
Marshall, Marshall & Yeasting
ATTORNEYS

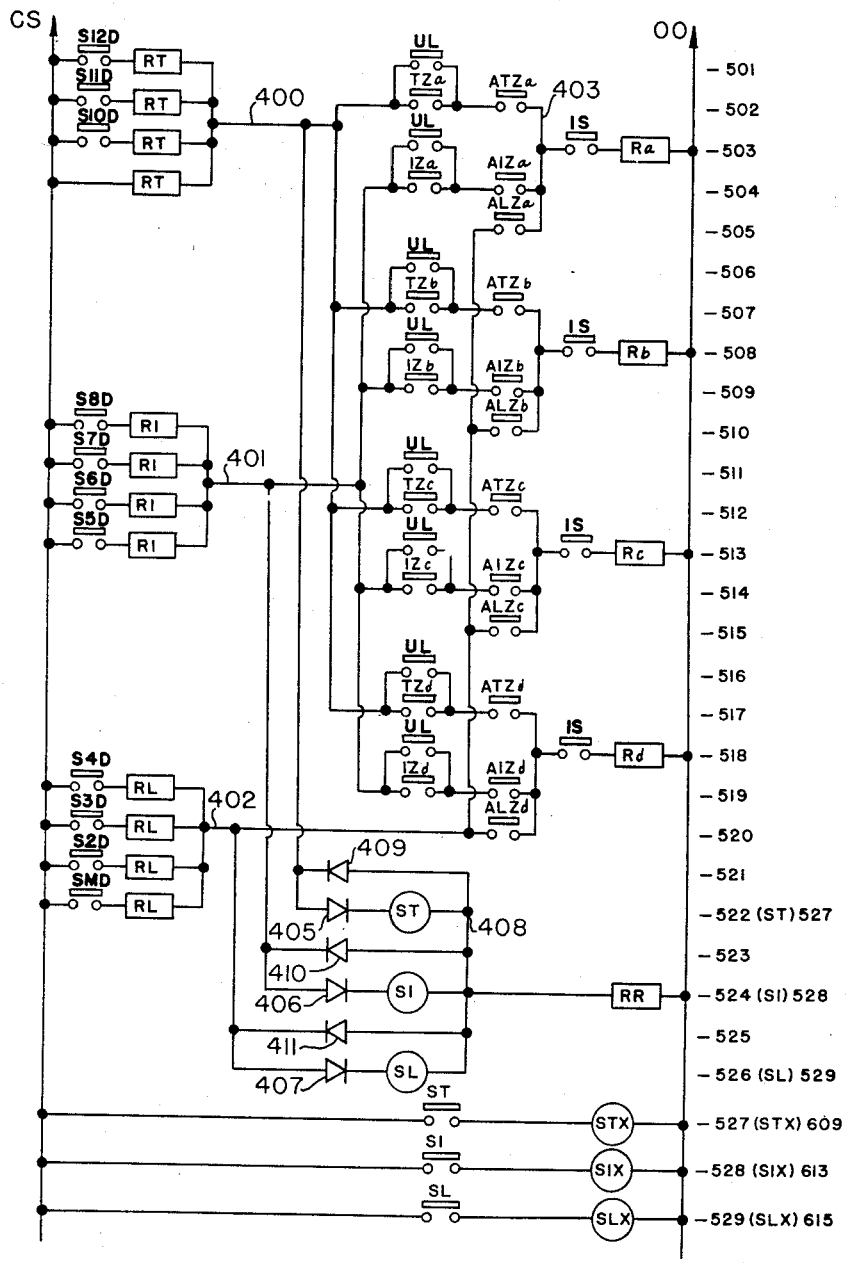
Fig. VI

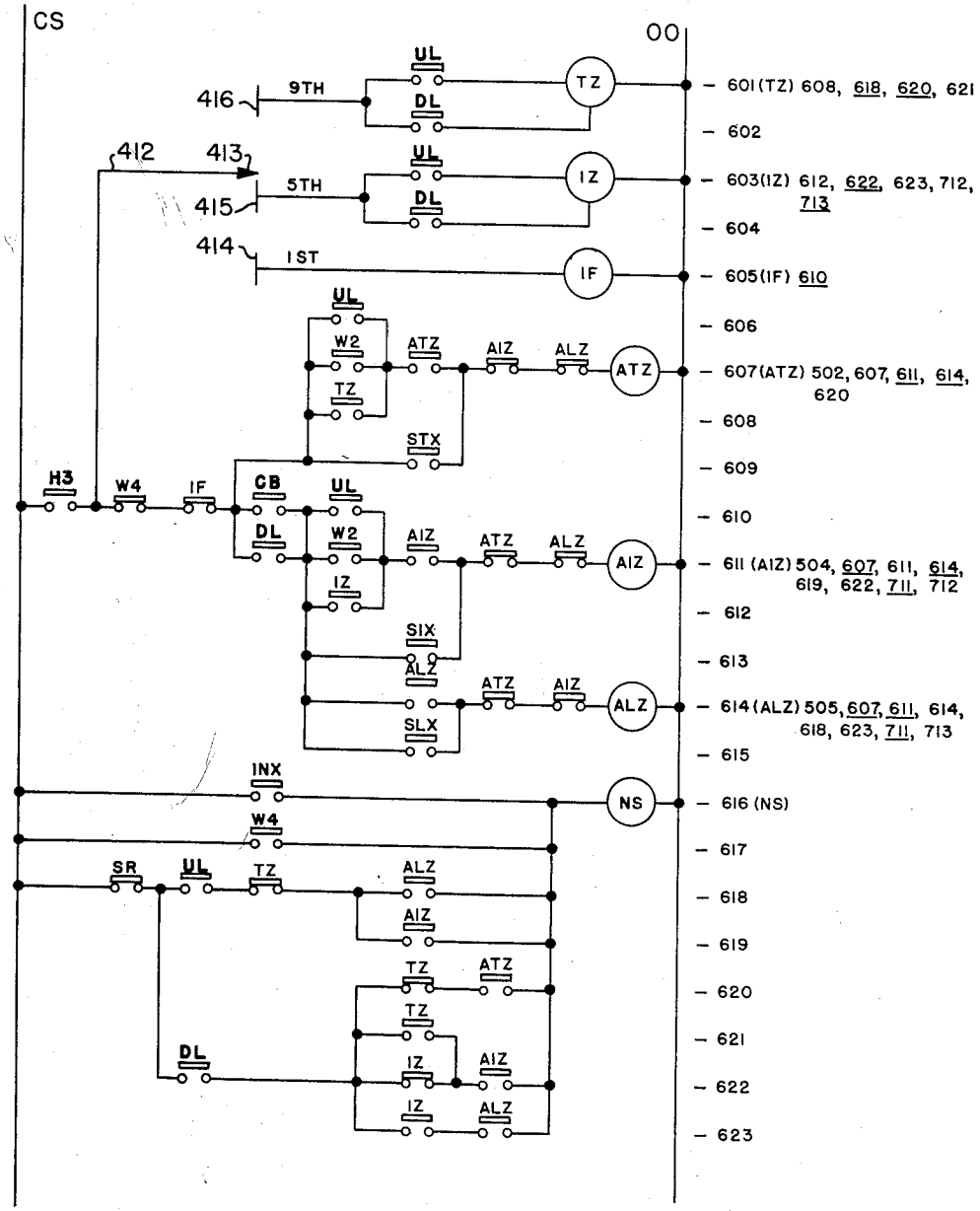
Fig. VII

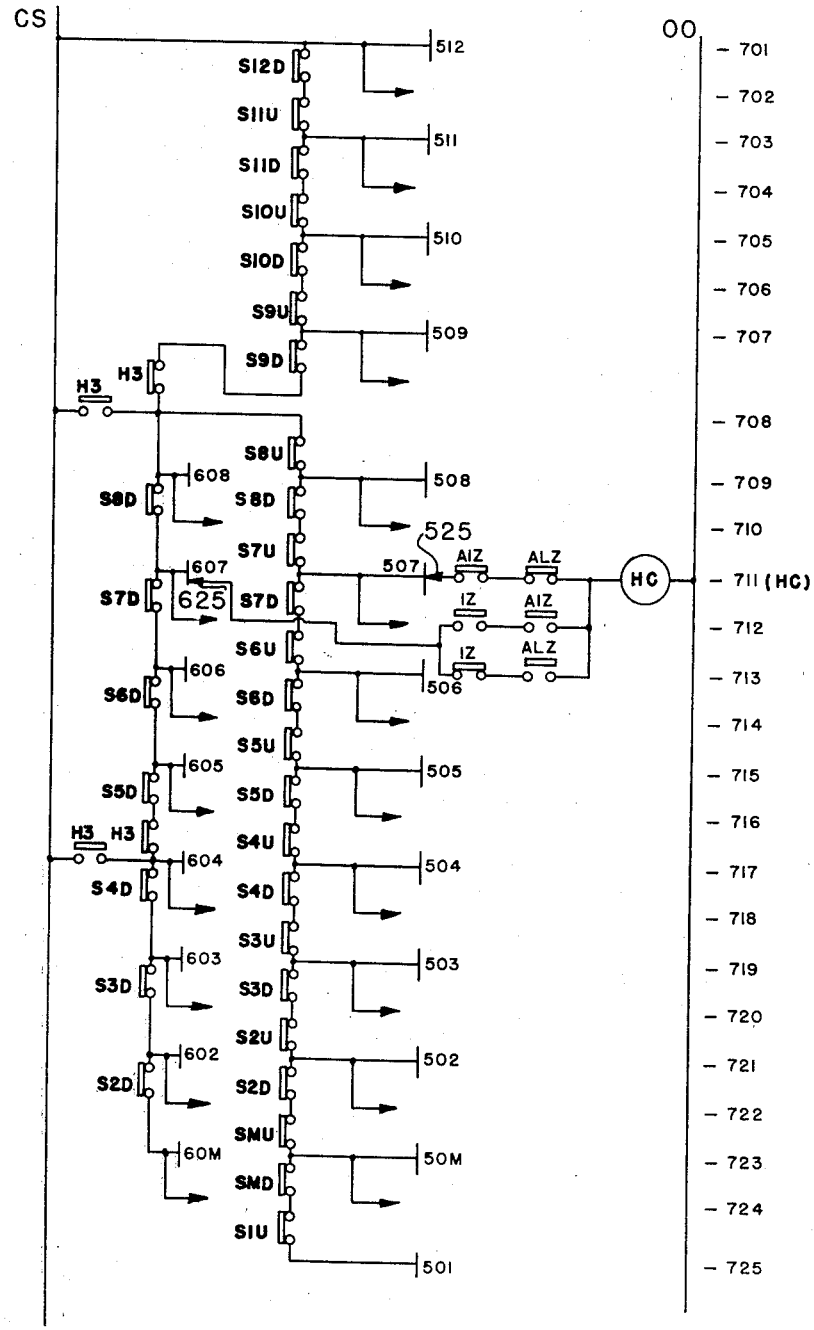
Fig. VIII
INVENTOR.
JOHN R. DINNING

United States Patent Office 2,933,156
Patented Apr. 19, 1960

2,933,156
ELEVATOR SUPERVISORY CONTROL
John R. Dinning, Los Angeles, Calif., assignor to Toledo Scale Corporation, Toledo, Ohio, a corporation of Ohio Application January 21, 1959, Serial No. 788,085
15 Claims. (Cl. 187—29)

This invention relates to elevator systems and in particular to automatic elevators subject to automatic supervisory control.

One of the problems involved in the supervisory control of any group of automatic elevators is the scheduling or assigning of the cars to serve particular zones or groups of floors in accordance with the demand at such floors in order that certain floors of a building may not monopolize the elevators to the detriment of service for the remaining floors.

The principal object of this invention is to provide automatic control equipment that is responsive to the distribution of calls for service and the distribution of the elevator cars and which is effective to assign cars to those zones of floors in need of service.

Another object of the invention is to provide automatic control equipment for continually comparing the number of calls for service in a particular zone with the number of cars assigned to that zone for each of the various zones making up the building served by the elevator system and, as each car becomes available, assigning such car to the zone then in need of service.

A still further object of the invention is to provide an automatic control system that is operable during periods of heavy down traffic for assigning each car that is available for selection to either a high zone of floors or a low zone of floors depending upon the number of calls registered in such zone and the number of cars then in position to serve such zone.

These and other objects and advantages may be obtained from a control system constructed and operated according to the invention.

According to the invention the supervisory control system includes means responsive to the number of calls for service registered in particular zones and to the number of cars assigned to such zones for assigning cars to that zone then in need of service. The comparing means preferably comprises a bridge circuit responsive to the number of calls registered in each zone and the number of cars then assigned to each zone. The bridge circuit is arranged to assign the cars, as they become available for assignment, to that zone having the higher proportion of calls to cars.

A preferred embodiment of the invention is illustrated in the accompanying drawings.

In the drawings:

Fig. I is a schematic diagram illustrating a bank of elevators with hall call registering means and indicating the general type of system that may employ automatic supervisory control.

Fig. II is a schematic diagram of the electrical means for registering hall calls.

Fig. III is a schematic diagram illustrating a preferred form of electrical circuit for comparing the number of calls for service registered with the number of cars assigned to each of two zones.

Fig. IV is a schematic diagram illustrating one arrangement for making car assignments in response to the comparing means illustrated in Fig. III.

Fig. V is a schematic diagram of a conventional high call reverse control circuit indicating one means of controlling the cars for assignment according to the invention.

Fig. VI is a schematic wiring diagram of means for comparing the calls per car for each of a plurality of zones greater than two.

Fig. VII is a schematic wiring diagram showing circuits for assigning cars to various zones of a multi-zone system in accordance with the demand for service.

Fig. VIII shows a high call reverse circuit arranged to cooperate with the circuits shown in Fig. VII.

These specific figures and the accompanying description are intended merely to illustrate the invention and not to impose limitations on its scope.

A typical elevator system in which the invention may be employed is illustrated generally in Fig. I as comprising a plurality of cars 10a, 10b, 10c and 10d each of which is suspended on a cable 11 that runs over a sheave 12 on an armature shaft 13 of an elevator drive motor 14 and is connected to a counterweight 15 adapted to counterbalance the weight of the car and a portion of the full load of the car. Ordinarily the counterweight is selected so that with an average load in the car the counterweight will balance the weight of the car and load.

A floor selector machine 16 is associated with each elevator and may be driven directly from the armature shaft 13 or by a separate cable directly from the elevator car 10. If the machine is driven directly from the armature shaft 13 suitable correcting means are employed to insure synchronism between the movement of the floor selector machine and the car 10 and thus correct for creepage of the cable 11 over the sheave 12.

The floor selector machines 16 are individually connected through an electrical cable 18 to a supervisory control panel 20 that may be energized from a source of power through leads 21 and which is also connected through a cable 22 to a series of down push buttons 23, one for each floor, for registering down hall calls and to a plurality of push buttons 24, one for each floor, for registering up calls for service. The uppermost and lowermost floors are provided with a single button since there can be no travel beyond such floors.

The supervisory control mechanism in the panel 20 together with the individual floor selector machines 16 provide means for controlling the operation of the elevator car so that the cars respond to calls registered by the hall buttons 23, 24 or to car buttons, not shown, mounted in the respective cars for registering destination calls. The control system also includes means for governing the starting and stopping of the cars as they answer registered calls.

Typical hall call registering circuits are illustrated in Fig. II. These comprise in addition to the push buttons 23 and 24 a series of double coil relays, one for each button, that is energized by operation of the associated push button and that seals itself to register a stopping call until a car stops in response to such call and energizes its second or neutralizing coil. For convenience the hall call relays for up calls are given numbers in the S–U series and the down hall call relays are given numbers in the S–D series.

Only those relays, of the many used in a complete elevator system, that are employed in or cooperate with the assignment circuits are shown. Those relays that are individual to a car are, where several appear in the same circuit, identified by lower case letter subscripts. The relays are:

| Relay | Description |
|---|---|
| 51 (a, b, c, d) | Low zone relay. |
| 52 (a, b, c, d) | Low zone assignment relay. |
| 56 (a, b, c, d) | High zone assignment relay. |
| 430 | No hall call relay. |
| 431 | No low zone down hall calls. |
| 455 | Balance detector relay. |
| 455X | Zone selection relay. |
| CB (a, b, c, d) | High car call relay. |
| DL (a, b, c, d) | Down directional memory relay. |
| H3 | Down peak relay (coil not shown). |
| HB | Hall button relay. |
| HC | High hall call relay. |
| INX (a, b, c, d) | Inspection relay. |
| IS (a, b, c, d) | In service relay (coil not shown). |
| NS (a, b, c, d) | Non stop relay. |
| S2D, S3D, etc. | Down hall call relays. |
| S1U, S2U, etc. | Up hall call relays. |
| UL (a, b, c, d) | Up directional memory relay. |
| W-2 (a, b, c, d) | Load relay, 40% load. |
| W4 (a, b, c, d) | Load relay, 80% load. |

In the description relay contacts are given the same reference characters as the relay and the particular circuits are identified by the line numbers. A code along the right of each figure at each relay location lists the lines where its contacts are shown. An underscored line number signifies normally closed contacts.

To register a call a push button, for example the button 24 in line 108, is pressed so that current may flow from a supply lead CS through the energizing coil of the first floor up relay S1U to a return lead 00. The relay thereupon closes its contacts S1U in line 109 to provide a sealing or by-pass circuit around the push button, and through a branch lead 1U, to energize appropriate contacts on each of the floor selector machines 16 so that a car approaching the floor while traveling in the up direction may stop at the floor. A third lead 26 from the relay S1U is connected to its reset coil so that when the car answers a call and completes a circuit through up reset lead 1RU to the return lead 00 the relay S1U is released to open its contacts S1U in line 109 thus canceling the indication of an up call at that floor.

Latch relays may be employed instead of the indicated relays to eliminate the sealing contacts shown along the left side of the diagram.

A third contact 27 in each of push buttons 23, 24 is arranged to energize a lead 28 whenever a button is held down to transmit current from the supply lead CS through the lead 28 to a hall button relay coil HB shown in line 114. This relay operates circuits to provide indications that a hall call button is being held down and is particularly useful during intermittent service in systems in which an operator is provided so that he may be alerted by operation of this relay.

Fig. III illustrates a preferred form of circuit for comparing the number of calls for service registered in a zone with the number of cars assigned to such zone for a pair of zones and indicating which of the zones is more in need of service. This circuit comprises a series of resistors R2 through R7, shown in lines 201 through 206, each of which is connected to a supply lead CS as long as a down hall call is registered for the associated floor. Thus a down hall call from the twelfth floor by closing contacts S12D in line 201 connects the first resistor R2 to the supply lead CS. Similarly down hall calls at floors down to the seventh floor connect corresponding ones of the resistors to the supply lead. The other terminal of each of the resistors R2 through R7 is connected through a common lead 30 which in turn may be connected through one of a number of parallel paths, one path for each car in the system. The path for car 10a includes a parallel combination of normally closed zone relay contacts 51a, shown in line 201, that are closed when the car is in the high zone and up memory relay contacts ULa that are closed as long as the car is traveling upwardly. This parallel combination is connected through normally open contacts 56a of a heavy high zone traffic assignment relay 56a and thence through in-service relay contacts ISa and a resistor Ra for the first car 10a. The other side of the resistor Ra is connected to the return lead 00. This circuit is duplicated for each of the cars.

A similar arrangement of resistors R8 through R13 have one terminal of each connected to a common lead 31 and have their other terminals connected through contacts of down hall call relays SMD through S6D shown in lines 214 to 209 respectively. The contacts SMD correspond to a down hall call at the mezzanine floor while the other contacts correspond to down hall calls at the second to sixth floors respectively. Lead 31 is also connected through heavy low zone traffic assignment relay contacts 52a, -b, -c or -d, shown in lines 209 to 212 respectively, to the junction points between the contacts 56 and IS for the respective cars.

This circuit is a Wheatstone bridge in which the voltage on the lead 30 with respect to the grounded lead 00 varies according to the number of calls registered in the high zone and the number of cars assigned to that zone by having their zone assignment relays 56 energized. Likewise, the voltage on the lead 31 varies according to similar conditions in the lower zone. The difference in potential between the leads 30 and 31, the detector diagonal of the bridge, is indicated by a sensitive polarized relay 455 shown in line 207 and serving as a balance detector. Preferably the polarized relay 455 is of a type having magnetic contacts so that once it is deflected in one direction a substantial current flow must exist in the opposite direction before the contacts will reverse their condition. The amount of current required to operate the relay from one condition to the other is adjusted to the minimum that can be used and still avoid hunting of the relay produced by the change in balance condition of the bridge circuit as a car resistor R (a, b, c, or d) is added to one leg of the bridge.

When the balance detector relay 455 is operated, which occurs when there is an excess of calls registered in the lower zone or an excess of cars assigned to the high zone, it closes its contacts in line 215 to energize a zone selection relay 455x shown in line 215. This relay has contacts 455x individual to each of the car assignment circuits.

The car assignment circuits are illustrated in Fig. IV. These circuits, individual to each car, include a zone indicating relay 51, shown in line 301, that is energized from a supply lead CS through a circuit including normally open contacts H3 of a down peak program relay, selector machine contact bar 35 that extends throughout the lower zone of floors and brushes 36 or 37 cooperating with the selector machine bar 35 and connected to the relay coil 51. The brush 37 is in series with down memory relay contacts DLa that are closed as long as the car is conditioned for downward travel. The spacing or synchronization of the brushes 36 and 37 is such that the relay 51 is energized or deenergized, as the case may be, as the car passes its slowdown distances from the sixth floor, the floor selected as the top of the low zone.

A heavy low zone traffic assignment relay 52, in line 303, and a heavy high zone traffic assignment relay 56, in line 306, are selectively energized according to the balance between calls registered and cars assigned as indicated by the sensitive balance relay 455 and the selection relay 455x. These relays may be energized from the supply lead CS through down peak traffic relay contacts H3 in line 301, normally closed load contacts W4 (line 303) of a load sensing relay, either high car call relay contacts CB or contacts DLa of a down memory relay, normally closed contacts 1F of a first floor relay, then through lead 40, up memory relay contacts UL, lead 41, normally open assigning relay contacts 455x, in line 304, or normally closed assigning relay contacts 455x, in line 305, and thence through normally closed assignment relay contacts 56 or 52 to the coils of assignment relays 52 and 56 respectively. When the car is standing at the first floor its contacts 1F, in line 303, are opened so that both of the zone assignment relays 52 and 56 are deenergized. The car can be assigned as it leaves the first floor in its upward travel when contacts 1F close provided it is unloaded and has no higher car calls, by energizing one or the other of the zone assignment relays 52 or 56 depending upon the condition of the bridge circuit shown in Fig. III. Assuming that at this instant the circuit of Fig. III is balanced and relay 455 has its contacts open so that relay 455x is deenergized, current flows through leads 40 and 41 normally closed contacts 455x, in line 305, and the coil of the heavy high zone traffic relay 56. This relay thereupon closes its contacts in line 201 thus completing a circuit through car resistor Ra from the lead 30 to the return lead 00 to add that resistor into the high zone side of the bridge circuit tending to unbalance the bridge toward the low zone. The relay 56 also closes its contacts 56, in line 306, to prepare a sealing circuit that includes a parallel combination of load relay contacts W2, in line 305, and normally closed zone relay contacts 51 in line 306. Since these latter contacts are both open the sealing circuit is not completed. Therefore, if this assignment of the car to the higher zone, as indicated by the energization of relay 56, to add a resistor in the high zone leg of the bridge circuit unbalances the bridge circuit, the sensitive relay 455 may respond and close its contacts to energize the assigning relay 455x. If this occurs the latter relay closes its contacts 455x, in line 304, at the same time that it opens its contacts in line 305. Since the sealing circuit for the high zone assignment relay 56 was not completed the opening of the contacts 455x deenergizes this relay and it by closing its normally closed contacts in line 303 permits the energization of the low zone assignment relay 52. This relay then closes its contacts in line 303 tn complete a sealing circuit at the same time that it closes its contacts in line 209, Fig. III, to insert the car resistor Ra into the low zone side of the bridge circuit. This assignment is held, regardless of bridge balance, until the car is loaded, has a higher car call or returns to the first floor.

In the event that the car has a higher car call (a car call requiring further upward travel) registered which results in opening of the high car call contacts CB in line 303 the assignment of the car to one or the other of the zones is canceled or delayed until the car has answered or served its highest car call.

A car assigned to the low zone travels upwardly, if conditioned for upward travel, until it reaches the highest down call in the low zone of floors. At that point it reverses as it answers such highest low zone down call and proceeds towards the lower terminal answering the down hall calls that are registered. If the car, having answered a high car call, is in the high zone when it is selected and assigned to low zone service, it reverses and bypasses down hall calls until it reaches the top of the low zone and then answers any down hall calls in the low zone. In similar manner a car selected for high zone service answers all up calls during its upward travel and all down calls in the upper zone during its downward travel. In the event that it is less than half loaded, contacts W2 open, when it enters the low zone it loses its zone assignment and thereafter answers any further down calls in the low zone as it proceeds toward the lower terminal.

Circuits for providing this operation are illustrated in the bottom portion of Fig. IV and in Fig. V. A non- stop relay NS shown in line 307 is effective, when energized, to cause the elevator car to ignore hall calls. This relay may be energized through normally closed inspection relay contacts INX in line 307 which are open as long as the car is available for normal service. The nonstop relay may also be energized through load relay contacts W4, line 308, which contacts close whenever the car becomes more than 80 percent loaded. The nonstop relay NS also may be energized through a circuit shown in lines 309 and 310 when the car is assigned to one or the other of the zones in response to a heavy down traffic demand from that zone and the car is not in the zone to which it is assigned. Thus in line 309 the nonstop relay is energized from supply lead CS through normally closed contacts SR of a stopping relay, up memory relay contacts UL that are closed as long as the car is conditioned for up travel, and normally open contacts 52 of the low zone assignment relay so that the car will not respond to up hall calls during its upward travel. During down travel contacts UL are opened and contacts DL at line 310 are closed so that a car assigned to the low zone with its contacts 52 closed then has its nonstop relay NS energized until it enters the low zone. As zone relay 51 is energized it opens the circuit to the nonstop relay so that the car may respond to hall calls. If it were assigned to the high zone its relay 56 would be closed so that contacts 56 in line 310 provide a path to energize the nonstop relay NS when the car enters the low zone and closes contacts 51 in line 310. If the car is at least half loaded, to close contacts W2, line 305, the car travels directly to the lower terminal.

If the car is less than half loaded the high zone assignment relay 56 is deenergized as the car enters the low zone by the opening of load contacts W2, line 305, and the zone relay contacts 51, line 306. When the relay 56 is deenergized indicating that the car is no longer assigned it opens its contacts in line 310 so that the car is then available for answering further down calls and its nonstop relay is then deenergized.

The circuits by which each car may recognize its highest hall call are illustrated in Fig. V. As shown therein a high hall call relay HC, shown at line 407, is arranged to be energized to initiate high call reverse whenever the car reaches the highest call to which it should respond. This is the highest hall call in the upper zone or the highest down hall call in the lower zone. When the car is not selected for low zone service the normally closed low zone assignment relay contacts 52, in line 406, are closed so that a brush 45 cooperating with a series of selector machine contacts 46 that are connected to intermediate points of a series a back or normally closed contacts of the hall call relays may connect the relay HC to the supply lead CS as soon as the car reaches the highest hall call. In the event the car has been assigned for low zone service the contacts 52 in line 406 are opened and contacts 52 in line 408 are closed so that the high hall call relay HC may be energized through a brush 47 and selector machine bars 48 or 49, the bar 49 extending from the sixth through the twelfth floor and being permanently connected to the supply lead CS. The bars 48 are individual to the various floors and are connected to points between other back contacts S2D, S3D, S4D, S5D, or S6D of the second to sixth floor down hall call relays. Thus a car assigned to the low zone has its relay HC energized as soon as it reaches the highest low zone down hall call or is at or above the sixth floor. Conversely if the car has been assigned to the high zone it responds through the brush 45 to the highest call registered in the system.

Two extra relays are illustrated in Fig. V, the relays 430 at line 410 and 431 at line 422. These relays are included to indicate the condition when there are no calls registered in the system such that the relay 430 is energized or that there are no down calls in the lower zone in which case only the relay 431 is energized. The relay 431, among other functions, operates contacts 431 at line 214 to connect the resistor R14 between the lead 31 and the ground lead 00 whenever there are no calls registered in the low zone.

The comparing circuit shown in Fig. III is actually a Wheatstone bridge in which the resistors R2 to R7 constitute one arm of the bridge, the resistors R8 to R13 constitute a second arm of the bridge and resistors $Ra$, $Rb$, $Rc$ and $Rd$ are arranged to be inserted in one or the other of the third and fourth legs of the bridge depending upon the assignment of the car to the upper or lower zone. The balance detector relay 455 is analogous to the ordinary galvanometer or detector used in ordinary bridge circuits. The bridge is in effect self-balancing because response of its detector or balance relay 455 to an unbalanced condition results in selection of one or the other of the relays 52 or 56, the low or high zone traffic relays, which inserts a resistance corresponding to that car into one or the other legs of the bridge to rebalance the bridge.

The operation of the circuit may be traced by assuming that at a particular instant there are four calls registered in the high zone and two calls registered in the low zone and one car assigned to each of the zones. This represents a condition in which the higher zone needs more service. In this condition the potential on the lead 30 is higher than that on the lead 31 so that the relay 455 moves to its contact open position thereby causing the next car that becomes available, as it leaves the first floor, to be assigned to the high zone. Such assignment places two of the resistors $R_A$ to $R_D$ into the leg of the bridge adjacent the conductor 30 thereby exactly rebalancing the bridge. Assuming that both of the original two cars which have been assigned are still assigned after the third assignment and the fourth car becomes available for assignment, it, since the balance relay 455 has not been subjected to reverse current, is tentatively assigned to the higher zone by energization of the high zone assignment relay 56. This in effect connects a third one of the car resistors into the high zone leg of the bridge thus producing a situation where there are four calls registered in the upper zone, three cars assigned to the upper zone, two calls registered in the lower zone and one car assigned to it. This is a preponderance of cars assigned to the upper zone and the bridge is then unbalanced so as to pass reverse current through the balance relay 455 so that it moves to its contact closing position. It thereupon energizes the assigning relay 455x and it by opening its contacts in line 305 cancels the assignment of that car to the high zone and prepares the circuit for its low zone assignment relay 52. As soon as the high zone relay 56 drops out the low zone relay is energized and it seals itself in thereby conditioning the car to serve the lower zone and at the same time by closing its contacts 52a (52b, 52c, or 52d) in lines 209 to 212 and the opening of the contacts 56a (56b, 56c, or 56d) in lines 201 to 207 transfers the car resistor from the high zone section to the low zone section thereby tending to rebalance the bridge with two cars assigned to the upper zone and two cars assigned to the lower zone.

In ordinary operation one or more of the cars would have returned to the lower terminal and had their assignments cancelled so that the condition of all cars being assigned at once is very unlikely to occur.

To take care of the situation that occurs when the last car to be assigned was assigned to the lower zone, answered all of the calls in the lower zone and returned to the lower terminal to cancel its assignment before another car was assigned, a resistor R14 is connected from the lead 31 to the return lead 00 through contacts 431 of the no low zone calls relay thus immediately operating the balance relay to assign the next car to the high zone. This avoids a false assignment.

Thus this circuit continually assigns cars to whichever of the zones is in need of the cars and thus balances the service to the various floors.

The circuits just described are suitable for assigning cars to one or the other of two zones according to the demands for service from such zones. There are occasions when it is desirable to divide the number of floors served by an elevator system into three or more zones. Circuits suitable for sensing the demand for service from three or more zones and assigning cars to such zones in accordance with the demand for service are illustrated in Figs. VI, VII and VIII. While the circuits are shown for a three zone system the principles of operation are such that they may easily be expanded to cover any number of zones that may be found desirable.

For purposes of illustration a system having 12 floors above a main or terminal floor has been selected and is divided into three zones of four floors each. Circuits are shown in which, for each zone, the ratio of the number of calls to the number of cars assigned is sensed and suitable selection relays are energized to assign cars, as they become available for assignment, to that zone having the greatest number of calls per car. Since low or intermediate zone cars do not answer up hall calls the circuit is further arranged so that in the event there are no calls in the top zone a car will nevertheless be assigned to that zone during its upward travel and therefore respond to any up hall calls that may be registered. Such an up traveling car assigned to the upper zone, in the absence of any calls in such zone, stops at the lowest floor in the zone, reverses, and starts down. As soon as it leaves the upper zone in its downward travel, being unloaded, it loses its high zone assignment and is then available for reassignment to whichever of the lower zones is then in greatest need for service.

In this control system for three or more zones four sets of relays are employed which are similar in some respects to some of the relays used in the selection system for two zones. These relays are:

AIZ—Assignment relay, intermediate zone
ALZ—Assignment relay, low zone
ATZ—Assignment relay, top zone
SI—Selection relay, intermediate zone
SL—Selection relay, low zone
ST—Selection relay, top zone
SIX—Auxiliary selection relay, intermediate zone
SLX—Auxiliary selection relay, low zone
STX—Auxiliary selection relay, top zone
IZ—Intermediate zone relay
TZ—Top zone relay Fig. VI shows the circuits for comparing among the various zones the ratio of calls registered in a zone to cars assigned to that zone and for selecting according to such ratios the zone requiring service. In the comparing circuit, resistors RT, one for each floor of the high zone, are connected through down hall call relay contacts S12D to S10D inclusive to a supply lead CS. The other terminals of the resistors RT are connected to a common lead 400. The resistor RT for the ninth floor, the lowest floor of the top zone, is connected directly to the positive supply lead CS so that this resistor is in the circuit at all times while the others are in the circuit only as long as a call is registered at the floor.

Similar sets of resistors RI and RL for the intermediate and low zones are provided. These are connected to the supply lead through down hall call relay contacts and, for the intermediate zone, are connected to a common lead 401 and, for the low zone, a common lead 402. In these lower zones all of the resistors are connected through hall call relay contacts so that none of the resistors are in the circuit unless a call is actually registered at the corresponding floor.

The lead 400, the common lead for the top zone resistors, is connected to return lead 00 through car resistors Ra, Rb, Rc, or Rd depending upon which of the cars is in service with its in service relay contacts IS closed, is assigned to the top zone, and is either moving up or is still in the top zone during movement down. Thus from the lead 400, assuming that car A is assigned to the top zone, the circuit may be traced through the parallel combination of contacts ULa, line 501, and top zone relay contacts TZa for car A in line 502, thence through top assignment zone relay contacts ATZa for car A to a common junction lead 403 that is connected through in-service relay contacts IS, and the resistor RA for car A to the return lead 00. Thus any car assigned to the top zone has its resistor connected to the common lead 400 for the top zone.

In like manner any car assigned to the intermediate zone has its resistor connected to the lead 401 as long as the car is traveling up or is in or above the intermediate zone.

Cars assigned to the low zone have their resistors connected to the lead 402.

This circuit thus comprises a plurality of branches, one for each zone, in which each branch is composed of two series connected portions a first of which comprises the parallel combination of the resistors representing the various floors at which calls are registered and a second portion which comprises the parallel combination of resistors representing the cars that are assigned to such zone. If there is only one car assigned to a zone there is only one resistor in the second portion of the branch circuit. The potentials on the leads 400, 401, or 402, the midpoints of the various branches of the circuit, vary according to the number of calls registered for the zone and the number of cars assigned to that zone. If there are no cars assigned to a zone the potential on the corresponding lead tends to approach or be equal to the potential of the supply lead CS. Likewise if there are no calls registered in the intermediate or lower zones and a car is assigned to such zone the potential of the leads 401 or 402 tends to be the same as the return lead 00. Thus the potential at the intermediate junction points, the leads 400, 401, or 402, varies according to the demand for service from the zone.

Potentials on these leads are compared by a circuit that includes sensitive selection relay ST for the top zone, SI for the intermediate zone, and SL for the lower zone. These sensitive selection relays, one for each zone, are connected through rectifiers 405, 406 and 407 to the leads 400, 401, and 402 respectively. The other terminals of the coils of the selection relays are tied to a common junction lead 408. The rectifiers 405, 406 and 407 are polarized to pass current from the leads 400, 401 or 402 through the coils of the selection relays to the common lead 408. Additional rectifiers, 409, 410 and 411 are connected between the common lead 408 and leads 400, 401 and 402 so as to pass current from the lead 408 to such branch circuits whenever the potential of the branch circuit is less than that of the lead 408. Lead 408 is also connected through a return resistor RR to the return lead 00 so that the selection relays may be operated even though there are no cars assigned at the moment.

In this arrangement one of the selection relays ST, SI and SL is energized as long as its branch circuit has a potential that is greater than the potential of the other branch circuits.

Preferably the selection relay ST, shown in line 522, for the top zone has greater sensitivity than the others so that in the event there is one car assigned to each zone and there are the same number of calls in each zone, thus resulting in an exactly balanced condition, the selection relay for the top zone will be energized by current flowing from the lead 400 through the rectifier 405 and coil of the selection relay and thence through the resistor RR to the return lead 00. Any unbalance between the branch circuits however will result in a predominant current flow through one of the relay coils thus allowing only one to be energized.

The selection relays ST, SI and SL for the top, intermediate and lower zones, respectively, when energized close their contacts in lines 527, 528 or 529 to energize auxiliary selection relays STX, SIX, and SLX for the various zones. Each of these relays has a set of normally open contacts for each car in the system which are effective to condition assignment selection circuits shown in Fig. VII individual to each of the cars.

The selection and assignment circuits individual to each of the cars in the system are shown in Fig. VII. These include a top zone relay TZ shown in line 601, an intermediate zone relay IZ shown in line 603 for each intermediate zone, and a first floor relay 1F shown in line 605. The intermediate and top zone relays are latch relays either of the mechanical latch type or magnetic latch type. These relays are arranged to be in their energized or latched condition as long as the car is in or above the corresponding zone. Thus in a three zone system two such latch relays are employed, one for the intermediate zone and one for the top zone. If the system is divided into more zones additional latch relays are required. These relays are energized from supply lead CS by way of down peak program contacts H3 in line 610, a lead 412, and a selector machine brush 413 that cooperates with stationary selector machine segments 414, 415 and 416 for the first, fifth and ninth floors. The first floor segment 414 is connected directly to the coil of the first floor relay 1F in line 605. The fifth floor segment 415, the segment for the bottom floor of the intermediate zone, is connected through up memory contacts UL, line 603, to a latching coil of the intermediate zone relay IZ and through down memory relay contacts DL to the release coil of the intermediate zone relay IZ. In similar manner the ninth floor segment 416 is connected through up memory relay contacts UL, line 601 to a latch coil of the top zone relay TZ and through down memory relay contacts DL, line 602, to a release coil of the top zone relay TZ. Thus in this circuit with the car standing at the first floor the first floor relay 1F is energized. As the car moves upwardly and arrives at or passes the fifth floor the intermediate zone relay is latched in and when a car arrives at or passes the ninth floor the top zone relay is latched in. Thus the zone relays are latched in as long as the car is in or above the zone represented by such relay. On the down trip with the down memory relay contacts DL closed the top zone relay is unlatched or released as the car arrives at or passes the ninth floor and the intermediate zone relay is released as the car arrives at or passes the fifth floor. If the segments 415 and 416 of the selector machine are arranged to be engaged by the brush 413 when the car is at the fifth and ninth floors respectively the zone relays are latched in when the car enters the zone and are unlatched or released when the car arrives at or passes the bottom floor of the zone on its way down. If this is undesirable, in other words if the zone indication is to be held until the car is actually leaving the zone, then the segments 415 and 416 should be located on the selector machines just below the fifth and ninth floor positions respectively. Thus, the intermediate zone relay is latched in as the car runs from the fourth to the fifth floor and the top zone relay is latched in as the car runs from the eighth to the ninth floor. Likewise on the down trip the relays are unlatched as the car runs from the ninth to the eighth and from the fifth to the fourth floors, respectively.

The assignment relays for a car are shown in lines 607, 611 and 614. The top zone assignment relay ATZ in line 607 is energized if there is a demand for service in the top zone as indicated by closure of contacts ST in line 527 to energize auxiliary top zone selection relays STX so that it closes its contacts in line 609. Thus when the car becomes available for selection, which is indicated by closure of down peak program contacts H3, line 610; the car is unloaded as indicated by the closure of normally closed load relay contacts W4; is not at the first floor as indicated by closure of contacts 1F; and is not assigned to other zones, a circuit is completed in lines 610, 609 and 607 from the supply lead CS to the coil of the top zone assignment relay ATZ. This relay immediately seals itself in through its contacts ATZ, line 607, which are in series with a parallel combination of up directional memory relay contacts UL, line 606, half load relay contacts W2, line 607, and normally open top zone relay contacts TZ in line 608.

In like manner, a car may be assigned to the intermediate zone, when it becomes available, by current flow from the first floor contacts 1F, line 610, through intermediate zone selection relay SIX, line 613, provided the car has no car calls and is not otherwise assigned. The intermediate zone assignment relay AIZ, line 611, when energized closes its contacts AIZ, line 611, to complete a sealing circuit which includes a parallel combination of up memory relay contacts UL, half load relay contacts W2, and intermediate zone relay contacts IZ, lines 610–612.

In like manner, if the selection relays call for an assignment of the next car to the low zone, contacts SLX of the auxiliary low zone selection relay are closed in line 615 so that the car is assigned, when available, to the low zone. This relay, when energized, completes a sealing circuit through its contacts ALZ, line 614, to maintain its assignment until it returns to the first floor or becomes more than 80 percent loaded as indicated by the opening of the load relay contacts W4, line 610.

In this arrangement, each car maintains its assignment after it becomes available for assignment and is assigned as long as it is traveling up unloaded and without higher car calls; is in or above the zone to which it is assigned; or is traveling down in a zone below that to which it is assigned but has more than a half load. In the event it is traveling down lightly loaded it loses its assignment as soon as it passes downwardly out of the assigned zone.

In this circuit the selection of the car and the assignment to a particular zone is delayed until after the car is away from the first floor and, except for assignment to the high zone, has no high car call registered. It can easily happen that an up traveling car has a car call requiring travel into the top zone when the demand for service is in the intermediate or low zone. Therefore, when the car becomes available for assignment after having served its highest car call, it is assigned to the intermediate or low zone. Such assignment causes it to immediately reverse and by-pass all calls in zones above the assigned zone so as to move directly to the top of the assigned zone and then pick up any down calls requiring service in such assigned zone.

The circuits for providing the non-stop operation are illustrated in lines 616–623 of Fig. VII. These include a non-stop relay NS in line 616 which when energized causes the car to ignore hall calls in either direction of travel. While non-stopping the car nevertheless stops when it reaches its highest call and also serves any car calls that may be registered. The non-stop relay NS is energized as long as the car is being operated during inspection, which is indicated by the closure of the contacts INX in line 616. It is also energized to cause the car to operate non-stop when it is fully loaded as indicated by closure of load contacts W4, line 617, because it is undesirable to stop a car unless it has capacity available to receive intending passengers. A car also operates non-stop when in a zone other than the one to which it is assigned by the circuits illustrated in lines 618 to 623 which include, for up travel, normally closed stopping relay contacts SR and up direction memory relay contacts UL, line 618, normally closed top zone relay contacts TZ in the same line and a parallel combination of low and intermediate zone assignment relay contacts ALZ and AIZ, lines 618 and 619. Thus during up travel as long as the car is in the low or intermediate zones and is assigned to one of those zones it operates nonstop. Under this condition it runs to the highest down call in the particular zone to which it is assigned. If the car is traveling up and is assigned to the top zone neither of the assignment relay contacts ALZ or AIZ in lines 618 or 619 are closed so that the car then stops for any uphall calls that it may encounter.

During down travel the up memory relay contacts UL are open and the down memory relay contacts DL are closed so the car having an assignment operates nonstop whenever it is in any zone to which it is not assigned. This is accomplished by the contacts illustrated in lines 620 to 623 which include in line 623 normally open contacts of the intermediate zone relay IZ and normally open contacts ALZ of the low zone assignment relay so that the car by-passes calls in the down direction as long as it is assigned to the low zone and is in or above the intermediate zone. If the car is assigned to the intermediate zone and is in the top zone as indicated by closure of top zone relay contacts TZ in line 621 the car will not stop until it gets into the intermediate zone. Likewise if the car is assigned to the intermediate zone and is traveling down with more than a half load so that its load relay contacts W2, line 611, are closed to hold its assignment the nonstop relay is energized through the circuit in line 622.

The combination of contacts in lines 621 and 622 are illustrative of any intermediate zone circuit whether there be one or more such intermediate zones. Thus, each intermediate zone circuit includes, in parallel, normally closed contacts of the zone relay for that particular zone and normally open contacts of the zone relay for the next above zone, this parallel combination being connected in series with the assignment relay contacts for that particular zone. Since the top zone circuit, line 620, has no zone above it, it includes only the normally closed top zone relay contacts TZ and the assignment relay contacts ATZ for the top zone.

This circuit thus provides down nonstop operation as long as the car is assigned to a zone other than the zone in which it is then located. If the car is above the zone to which it is assigned it nonstops down to the assigned zone regardless of its condition of loading. If it is in a zone below the zone to which it is assigned and is more than half loaded, to maintain its assignment, it by-passes down hall calls and proceeds directly to the lower terminal to discharge its load and be assigned to whichever zone then requires service.

Fig. VIII shows the high hall call circuits for signaling each of the elevator cars when it has reached the highest call to which it should respond. This circuit includes a chain of series connected normally closed or back contacts of the hall call relays which, starting from a power lead CS, includes, in order, the down hall call relay contacts for the twelfth or top floor, the up contacts for the eleventh floor, down contacts for the eleventh floor, up contacts for the tenth floor, down contacts for the tenth floor, etc., to and including up call contacts for the basement floor. Selector machine segments 512 for the top or twelfth floor, 511 for the eleventh floor, etc., are provided on each of the selector machines and are connected to the junction point between the contacts of the up and down floor call relays for that particular floor. A brush 525 engaging the series of segments 512, etc., is connected through series connected normally closed contacts AIZ and ALZ of the intermediate and low zone assignment relays to a coil of a high hall call relay HC in line 711. As long as the system is not operating on the down peak this circuit energizes the high hall call relay HC as long as the car is at or above the highest hall call requiring no further upward travel. When the system is conditioned for down peak traffic a downpeak relay H3 is energized to open its contacts H3 shown connected between the up eighth floor contacts and down ninth floor contacts of the series chain of contacts so as to break the circuit at this point thus insuring that any car assigned to the high zone or having no assignment while traveling up will travel at least to the ninth floor.

Since it is desirable that cars assigned to the intermediate and low zones travel to the highest down hall call and ignore up hall calls that may be registered in the zone or zones and which are answered by a car assigned to the high zone, a second series of selector machine segments 608, 607, etc., are connected to a second series of normally closed down hall call relay contacts. This circuit, when on down peak operation, is separated from the series of up and down hall call relay contacts and is energized from the power lead CS directly at the eighth floor point of the circuit through contacts H3 shown in line 708. A brush 625 cooperating with this series of selector machine segments is connected through normally open intermediate zone relay contacts IZ and intermediate assignment zone relay contacts AIZ connected in series in line 712 to energize the high hall call relay HC when the car is assigned to the intermediate zone and reaches the highest hall call in the intermediate zone. Likewise, the brush 625 is connected through normally closed intermediate zone relay contacts IZ and normally open low zone assignment relay contacts ALZ to energize the high hall call relay HC whenever the car is assigned to the low zone and has reached the highest hall call in the bottom or lower zone. The lower zone segments 604, 603 and so forth are separated from the series of segments for the intermediate zone by down peak relay contacts H3 interposed between the fourth and fifth floor hall call relay contacts. The lower series is then directly connected at the terminal point of segment 604 through normally open contacts H3 to the supply lead CS.

In this arrangement the car travels up, when assigned to the low or intermediate zone, until it reaches the highest down hall call in the particular zone.

In the event the system is to be divided into more than three zones the series circuit of down hall call relay contacts in the high hall call circuit is divided into more sections and additional zone relays and assignment zone relays are added so that the high hall call relay HC is energized only when the car is at the top down call in the zone to which it is assigned.

This circuit thus provides means to distribute, during down peak traffic conditions, elevator service among a plurality of zones in accordance with the demand for service from the various zones.

Various modifications of the circuits may be made without losing the advantages of the improved supervisory control circuit.

Having described the invention, I claim:

1. In a supervisory control system for a group of elevator cars serving a plurality of floors, in combination, means for registering calls for service from a first zone of floors, means for registering calls for service from a second zone of floors, means for assigning cars to serve each zone of floors, means for comparing the number of cars assigned to each zone with the number of calls for service registered in each zone, said comparing means being arranged to control the assigning means to assign cars to that zone then having the greater ratio of calls to assigned cars.

2. In a supervisory control system for a group of elevator cars serving a plurality of floors, in combination, means for registering calls for service from a first and a second zone of floors, means for assigning cars to serve each zone of floors, means for comparing the number of cars assigned to each zone with the number of calls registered from such zone, means for canceling an assignment when the car reaches a predetermined point in its travel, said comparing means being connected to the assigning means to effect assignment of an unassigned car to the zone of floors then having the higher ratio of calls to assigned cars.

3. In an elevator system, in combination, means for registering calls for service from each of a plurality of zones of floors, a plurality of cars that are individually assignable to respective zones of such floors, comparing means arranged to compare the number of calls for service in each zone with the number of cars assigned to such zone, and assigning means responsive to the comparing means arranged to assign the cars to the zones of floors.

4. In an elevator system, in combination, means for registering calls for service from each of a plurality of zones of floors, a plurality of cars that are individually assignable to respective zones of such floors, comparing means arranged to compare the number of calls for service in each zone with the number of cars assigned to such zone and to indicate the zone having a low ratio of cars to calls, and assigning means responsive to the comparing means arranged to assign a car to the indicated zone.

5. In a supervisory control system for a group of elevator cars serving a plurality of floors, in combination, means for registering calls for service from a first zone of floors, means for registering calls for service from a second zone of floors, means for assigning cars to serve the first zone of floors, second means for assigning cars to serve the second zone of floors, and means for comparing the ratio of the number of calls for service in each zone of floors to the number of cars assigned to such zone arranged to energize said second assigning means in response to an unbalance in favor of the first zone between the number of calls in zone group and the number of cars assigned to each zone.

6. In a supervisory control system for a group of elevator cars serving a plurality of floors, in combination, means for registering calls for service from a first zone of floors, means for registering calls for service from a second zone of floors, means for assigning cars to selectively serve the zones of floors, means for comparing the ratios of the number of calls to the number of cars assigned in each of the zones, said comparing means being arranged with the assigning means to assign cars to that group of floors having the higher ratio of calls to assigned cars.

7. In a supervisory control system for a group of elevator cars serving a plurality of floors, in combination, means for registering calls for service from said plurality of floors, said plurality of floors being divided into an upper zone and a lower zone, means for assigning cars to selectively serve the zones of floors, means for comparing the number of calls from each zone with the number of cars assigned to the zone, means arranged to tentatively assign each car as it becomes available for assignment to the upper zone and to reassign such car to the lower zone when such tentative assignment results in a lower ratio of calls to cars in the upper zone.

8. In a supervisory control system for a group of elevator cars serving a plurality of floors, in combination, means for registering calls for service from a first and a second zone of floors, means for assigning cars to serve each zone of floors, means for sensing the traffic demand in each zone in proportion to the cars assigned to such zone, said assigning means being connected to the sensing means and adapted to assign cars to the zone having the greater traffic demand.

9. In a supervisory control system for a group of elevator cars serving a plurality of floors, in combination, means for registering calls for service from each of a plurality of zones of floors, a plurality of cars that are individually assignable to the respective zones of floors, means for continuously sensing the traffic demand from each of the plurality of zones, and assigning means responsive to predetermined traffic demands for assigning the cars to the respective zones of floors.

10. In an elevator system, in combination, a plurality of elevator cars for serving a plurality of floors, means for moving said cars in response to signals to serve the plurality of floors, means for registering calls for service from each of the floors served by the cars, said floors being divided into a plurality of zones, means for indicating the demand for service in each zone as compared with the service given such zone, and means connected to the indicating means for assigning cars to the zone having the greatest demand for service.

11. In an elevator system, in combination, a plurality of elevator cars arranged to serve a plurality of floors, means for moving the cars in response to demands for service, means for registering calls for service from each of the floors served by the elevator cars, said floors being divided into zones, said cars being assignable to serve respective zones of floors, means individual to each zone for generating a signal indicative of the traffic demand in the zone and the number of cars assigned to the zone, and means for comparing the signals and assigning cars in response to the relative magnitudes of the signals.

12. In an elevator system, in combination, a plurality of elevator cars arranged to serve a plurality of floors, means for starting and stopping said cars in response to demands for service, said floors being divided into an upper zone and a lower zone, said cars being individually assignable to serve respective zones, means for sensing the demand for service in each zone and the cars assigned to such zone, said sensing means comprising a bridge circuit two arms of which comprise resistors individual to the floors that are connected in circuit by demands for service and two arms of which comprise resistors individual to the cars assigned to the zones, a detector for the bridge circuit, and means connected to the detector arranged to assign cars to the zones.

13. In an elevator system, in combination, a plurality of elevator cars arranged to serve a plurality of floors, means for starting and stopping said cars in response to demands for service, said floors being divided into an upper zone and a lower zone, said cars being individually assignable to serve respective zones, means for sensing the demand for service in each zone and the cars assigned to such zone, said sensing means comprising a bridge circuit in which a first arm comprises one resistor for each call registered in said upper zone, a second arm comprises one resistor for each call registered in said lower zone, a third arm comprises one resistor for each car assigned to the upper zone, and the fourth arm comprises one resistor for each car assigned to the lower zone, a detector for said bridge circuit, and car assigning means responsive to said detector for assigning cars.

14. A system according to claim 13 in which the resistors included in each arm of the bridge are connected in parallel.

15. A system according to claim 13 having means for sensing the absence of calls for service in the lower zone, and means responsive to such sensing means adapted to add a resistor to the fourth arm of said bridge circuit.

No references cited.